(12) United States Patent
Lim

(10) Patent No.: US 10,458,527 B2
(45) Date of Patent: Oct. 29, 2019

(54) POWER TRANSMISSION DEVICE

(71) Applicant: SEJIN-IGB CO., LTD., Asan-si, Chungcheongnam-do (KR)

(72) Inventor: Sun Ho Lim, Asan-si (KR)

(73) Assignee: SEJIN-IGB CO., LTD. (KR)

( * ) Notice: Subject to any disclaimer, the term of this patent is extended or adjusted under 35 U.S.C. 154(b) by 243 days.

(21) Appl. No.: 15/543,202

(22) PCT Filed: Nov. 6, 2015

(86) PCT No.: PCT/KR2015/011916
§ 371 (c)(1),
(2) Date: Jul. 12, 2017

(87) PCT Pub. No.: WO2016/117809
PCT Pub. Date: Jul. 28, 2016

(65) Prior Publication Data
US 2018/0003274 A1    Jan. 4, 2018

(30) Foreign Application Priority Data

Jan. 20, 2015 (KR) .................. 10-2015-0009240

(51) Int. Cl.
| | | |
|---|---|---|
| F16H 55/10 | (2006.01) | |
| F16H 19/04 | (2006.01) | |
| F16H 55/20 | (2006.01) | |
| F16H 1/04 | (2006.01) | |
| F16H 1/32 | (2006.01) | |
| F16H 57/04 | (2010.01) | |

(Continued)

(52) U.S. Cl.
CPC .............. *F16H 19/04* (2013.01); *F16H 1/04* (2013.01); *F16H 1/32* (2013.01); *F16H 55/10* (2013.01); *F16H 55/20* (2013.01); *F16H 57/043* (2013.01); *F16H 1/24* (2013.01); *F16H 1/28* (2013.01); *F16H 55/26* (2013.01)

(58) Field of Classification Search
CPC ...... F16H 57/038; F16H 57/031; F16H 55/10; F16H 1/24; F16H 55/20
See application file for complete search history.

(56) References Cited

U.S. PATENT DOCUMENTS

2008/0047773 A1* 2/2008 Halliday ............... F16H 19/04
180/400

FOREIGN PATENT DOCUMENTS

| CN | 1965176 A | 5/2007 |
|---|---|---|
| CN | 103097773 A | 5/2013 |

(Continued)

OTHER PUBLICATIONS

Revilla, "Supplementary European Search Report", European Patent Office, 80298 Munich Germany.

*Primary Examiner* — Zakaria Elahmadi
*Assistant Examiner* — Randell J Krug
(74) *Attorney, Agent, or Firm* — Renaissance IP Law Group LLP

(57) ABSTRACT

A power transmission device includes a pin gear having a plurality of power transmission pins that are relatively moved corresponding to a tooth shape formed on an outer gear, a motor arranged in a direction crossing a rotation axis of the pin gear, and generating power to rotate the pin gear, and a motion transfer unit connected to the pin gear and the motor between the pin gear and the motor, and transferring a rotational motion of the motor to a rotational motion of the pin gear.

14 Claims, 15 Drawing Sheets

(51) Int. Cl.
    *F16H 1/24*     (2006.01)
    *F16H 1/28*     (2006.01)
    *F16H 55/26*     (2006.01)

(56) References Cited

FOREIGN PATENT DOCUMENTS

| | | | |
|---|---|---|---|
| DE | 102009005343 A1 * | 7/2010 | ........... F16H 57/021 |
| GB | 2416018 A | 1/2006 | |
| JP | 7033358 A | 2/1995 | |
| JP | 10184842 A | 7/1998 | |
| JP | 2008505285 A | 2/2008 | |
| JP | 2013533442 A | 8/2013 | |
| KR | 200155923 | 9/1999 | |
| KR | 101009742 B1 | 1/2011 | |
| KR | 20120121470 A | 11/2012 | |

* cited by examiner

Prior Art

POWER TRANSMISSION DEVICE

TECHNICAL FIELD

The present inventive concept relates to a power transmission device, and more particularly, to a power transmission device which may perform a stable operation, may have a reduced overall height, and may be widely applied to compact apparatuses such as an index system.

BACKGROUND ART

Power transmission devices may include a rack and pinion that converts a rotational motion into a linear motion or vise versa, and a gear train that converts a rotation speed and torque while transferring a rotational motion only.

In a typical case, a power transmission system of a power transmission device uses a pin gear mainly with a tooth shape based on an involute curve principle, sometimes with a tooth shape based on a cycloid curve principle.

The power transmission devices have been widely used for various industrial machines including semiconductor equipment, flat display equipment for LCDs, PDPs, OLEDs, etc.

FIG. 1 is a side view illustrating a configuration of a power transmission device according to the related art in a use state.

Referring to FIG. 1, the power transmission device 1 according to the related art may be partially coupled to a slider 3, for example, to allow the slider 3 coupled to a base plate 2 in a structure of a rail 4 to have a linear motion.

For the linear motion of the slider 3 with respect to the base plate 2, the power transmission device 1 connected to the slider 3 may include a pinion 6 that is engaged with a rack 5 fixed to an area of the base plate 2.

The pinion 6 is coupled to an end portion of a shaft 7 extending outwardly from the power transmission device 1 and engaged with the rack 5 during the assembly of the device of FIG. 1.

In the above structure, when a motor 8 of the power transmission device 1 is driven, the shaft 7 is rotated based on interactions of built-in parts of the power transmission device 1 and thus the pinion 6 is rotated.

As the pinion 6 is engaged with the rack 5 that is positionally fixed, the pinion 6 is consequently rotated, performing a linear motion along a lengthwise direction of the rack 5, thereby implementing the linear motion of the slider 3 with respect to the base plate 2.

Accordingly, when a desired part or apparatus is mounted on the slider 3, the part or apparatus may perform a linear motion.

The structure of the power transmission device 1 of FIG. 1 is one of the most used shapes at sites. Since the motor 8 is directly coupled to a rotation shaft of the pinion 6 with a decelerator 9, the overall height H1 of the power transmission device 1 may be increased.

When the overall height H1 of the power transmission device 1 is increased as in the related art, there may be a limit in the application of the power transmission device 1 to a compact apparatus.

For example, considering that it is difficult to apply the power transmission device 1 having a high height H1 as illustrated in FIG. 1 to a compact apparatus such as an index system (INDEX) that is widely applied to semiconductor equipment or flat display equipment, there is a demand for development of technology about a power transmission device that may have a reduced overall height H1 and may perform a stable operation.

DETAILED DESCRIPTION OF THE INVENTIVE CONCEPT

Technical Problem

The present inventive concept provides a power transmission device which may perform a stable operation and have a reduced overall height, thereby being widely applied to compact apparatuses such as an index system.

Advantageous Effects

According to the present inventive concept, since the power transmission device may perform a stable operation and have a reduced overall height, the power transmission device may be widely applied to compact apparatuses such as an index system.

BEST MODE

Figure 1:
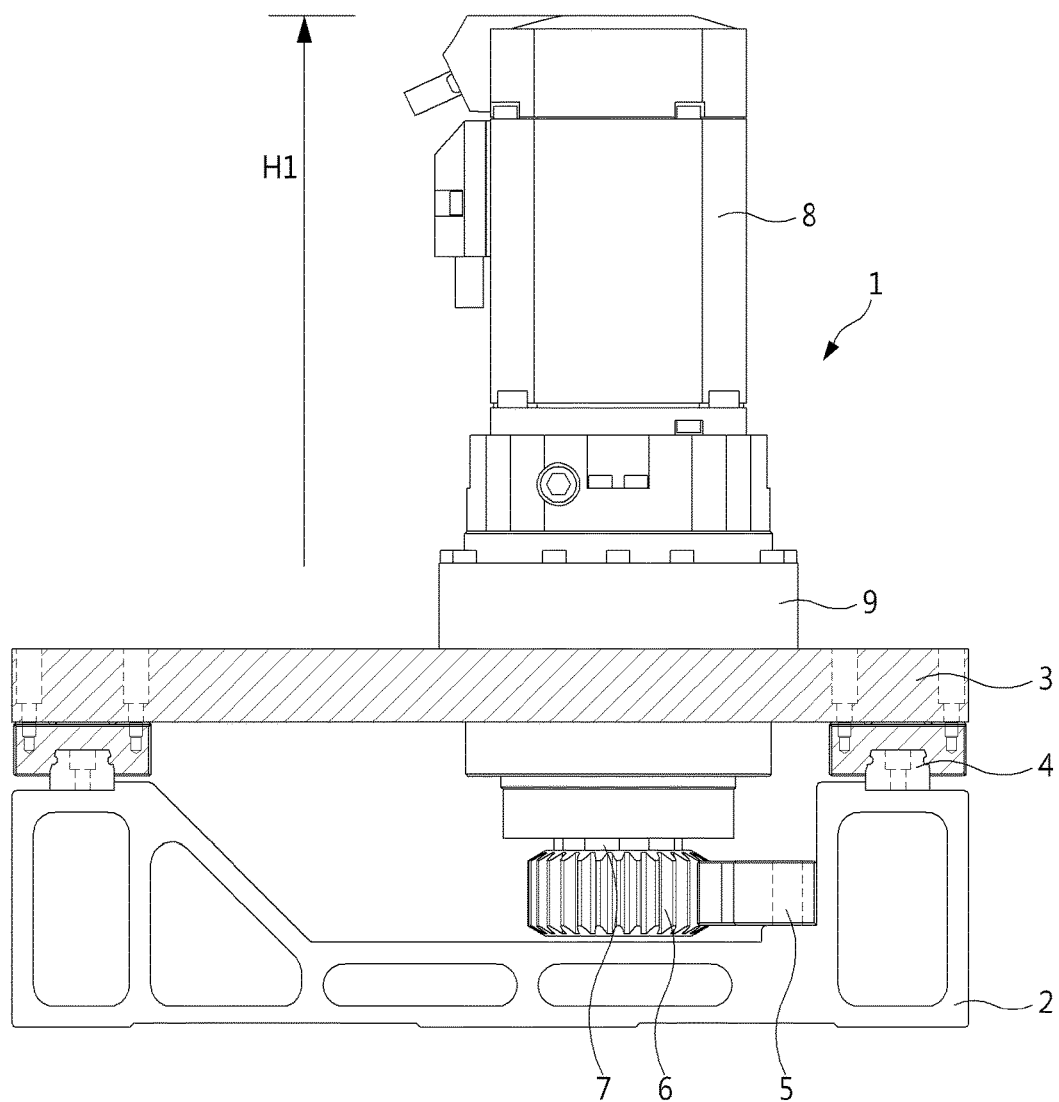
FIG. 1 is a side view illustrating a configuration of a power transmission device according to the related art in a use state.

According to an aspect of the present inventive concept, a power transmission device includes a pin gear having a plurality of power transmission pins that are relatively moved corresponding to a tooth shape formed on an outer gear, a motor arranged in a direction crossing a rotation axis of the pin gear, and generating power to rotate the pin gear, and a motion transfer unit connected to the pin gear and the motor between the pin gear and the motor, and transferring a rotational motion of the motor to a rotational motion of the pin gear.

The motion transfer unit may include a unit housing, and a built-in deceleration module provided in the unit housing, and decelerating a rotation force of the motor and transferring a decelerated rotational force to the pin gear.

The built-in deceleration module may include a drive gear inserted in a first opening formed in the unit housing in a direction crossing the rotation axis of the pin gear, and rotated by the motor, and a driven gear inserted in a second opening communicating with the first opening and formed in a direction crossing the first opening, and decelerating a rotation force of the drive gear by being engaged with the drive gear.

The drive gear may be a drive bevel gear, and the driven gear may be a driven bevel gear.

The built-in deceleration module may further include a drive bevel gear fixing member coupled to the drive bevel gear and fixing the drive bevel gear, and a first coupling portion coupling the drive bevel gear fixing member to the drive bevel gear.

The built-in deceleration module may further include a plurality of drive side bearings that are arranged spaced apart from the drive bevel gear fixing member and guiding rotation of the drive bevel gear.

The built-in deceleration module may further include a drive bevel gear allowance adjustment member that is coupled to the drive bevel gear by the first coupling portion by contacting the drive bevel gear fixing member and adjusts allowance in an axial direction of the drive bevel gear.

The built-in deceleration module may further include a plurality of driven side bearings that are connected to the driven bevel gear at the second opening and guide rotation of the driven bevel gear.

The built-in deceleration module may further include a driven bevel gear allowance adjustment member that is connected to the driven bevel gear and adjusts assembly position allowance of the driven bevel gear.

The built-in deceleration module may further include a driven bevel gear fixing adaptor that fixes the driven bevel gear to the unit housing.

The built-in deceleration module may further include a drive gear that is connected to the driven bevel gear in an area of the second opening.

The built-in deceleration module may further include a drive gear pressing and insertion structure connected to the drive gear forming one body, and including a shaft pressing and insertion portion having a shaft pressing and insertion hole in which a non-circular shaft formed at one end portion of the drive gear is pressed and inserted, and a plurality of pin insertion holes in which a plurality of connection pins formed on the driven bevel gear are inserted, and a drive gear coupling portion coupling the drive gear and the drive gear pressing and insertion structure.

The built-in deceleration module may further include a driven gear coupled to a third opening formed in the unit housing in a direction parallel to the second opening neighboring the drive gear, and transferring the rotation force from the drive gear to the pin gear.

The built-in deceleration module may further include a plurality of output side bearings coupled to the driven gear and guiding rotation of the driven gear, and a driven gear preliminary pressure member coupled to the driven gear and preliminarily pressing the driven gear.

The motion transfer unit may further include a driven gear cover coupled to the unit housing and protecting the driven gear, an output end fixed plate coupled to the unit housing at an opposite side of the driven gear cover and preventing escape of the driven gear, and a drive gear cover coupled to the unit housing and protecting the drive gear.

The power transmission system may further include a motor connection portion coupled to the first opening and connecting the motor and the drive gear.

The motor connection portion may include a motor mount block on which the motor is mounted, a motor clamp coupled to the motor mount block and clamping the motor, an input axis structure coupled to the first opening of the unit housing, an input axis fixing adaptor connected to the input axis structure and the motor mount block and transferring a rotation force of the motor to the drive gear, and an input side oil seal arranged in front of the input axis fixing adaptor toward the unit housing.

At least one assembly reference alignment portion may be further formed in the unit housing.

The outer gear may be one of a rack, an external gear, and an internal gear.

MODE OF THE INVENTIVE CONCEPT

The attached drawings for illustrating preferred embodiments of the present inventive concept are referred to in order to gain a sufficient understanding of the present inventive concept, the merits thereof, and the objectives accomplished by the implementation of the present inventive concept. Hereinafter, a multi-input pad for simultaneously sensing a capacitive touch and an induced electromagnetic field input according to the present inventive concept will be described in detail by explaining preferred embodiments of the inventive concept with reference to the attached drawings. Like reference numerals in the drawings denote like elements.

Figure 2:
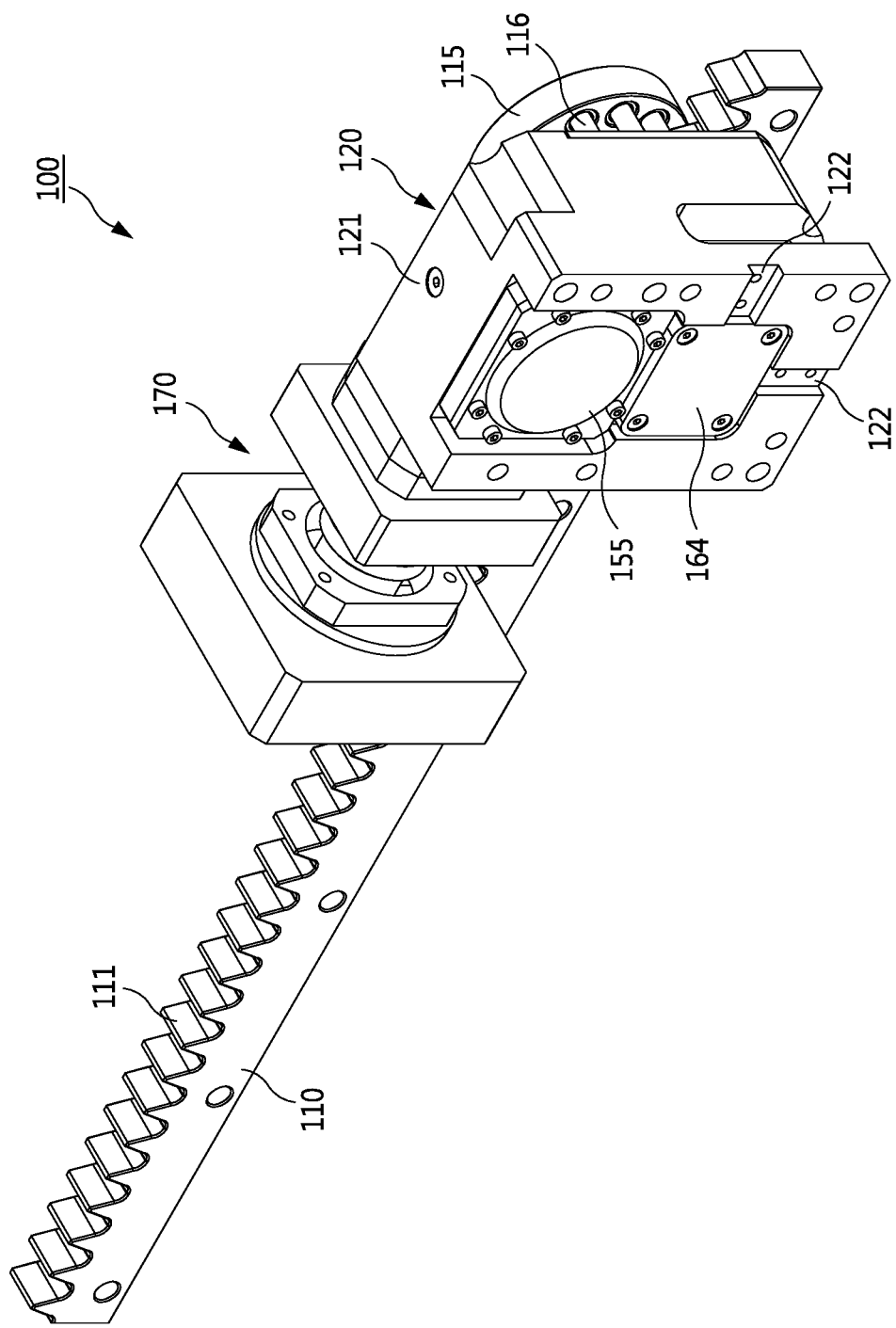
FIG. 2 is a perspective view of a power transmission device according to an embodiment being coupled to a rack.
Figure 3:
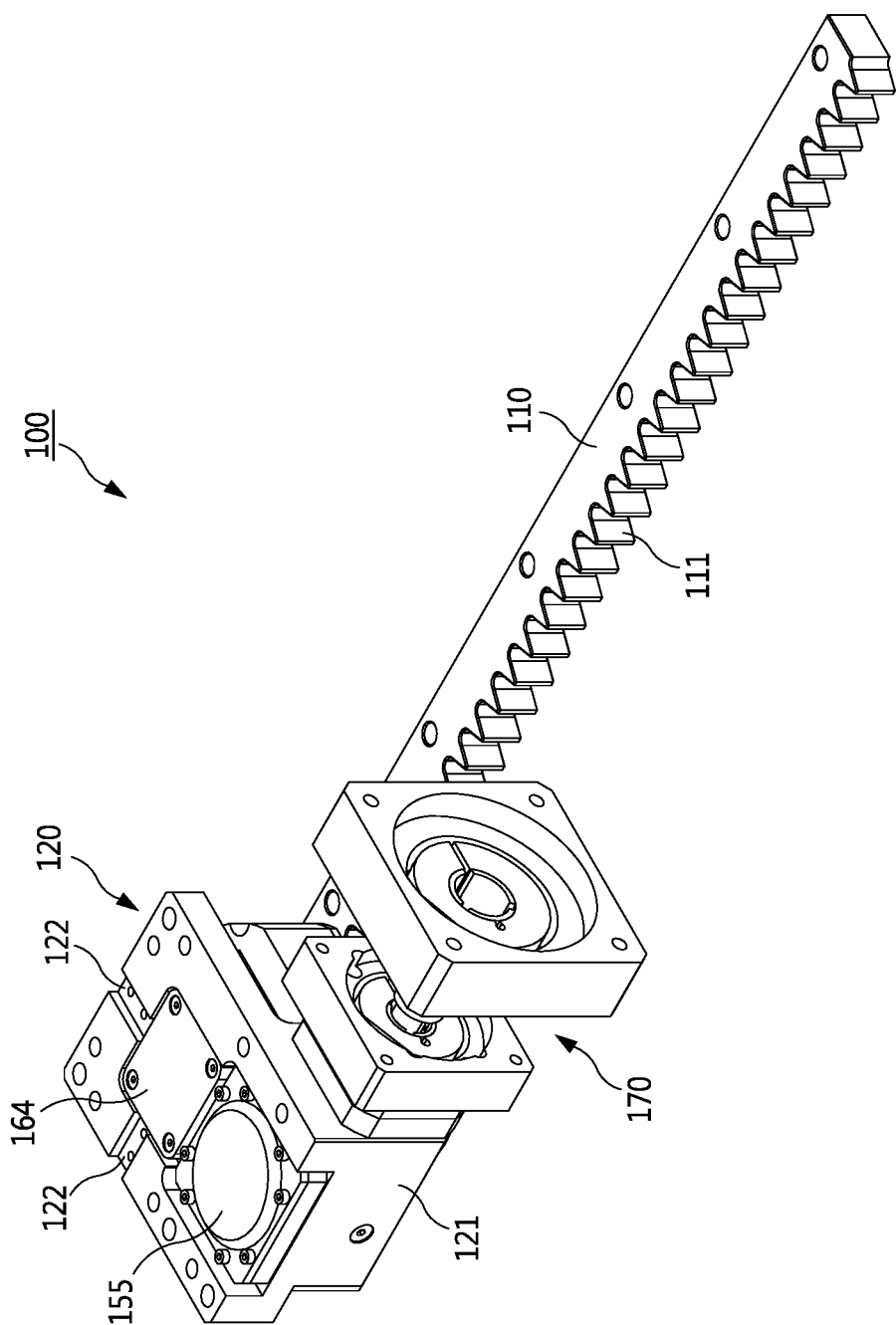
FIGS. 3 and 4 are perspective views of FIG. 2 at different angles.
Figure 4:
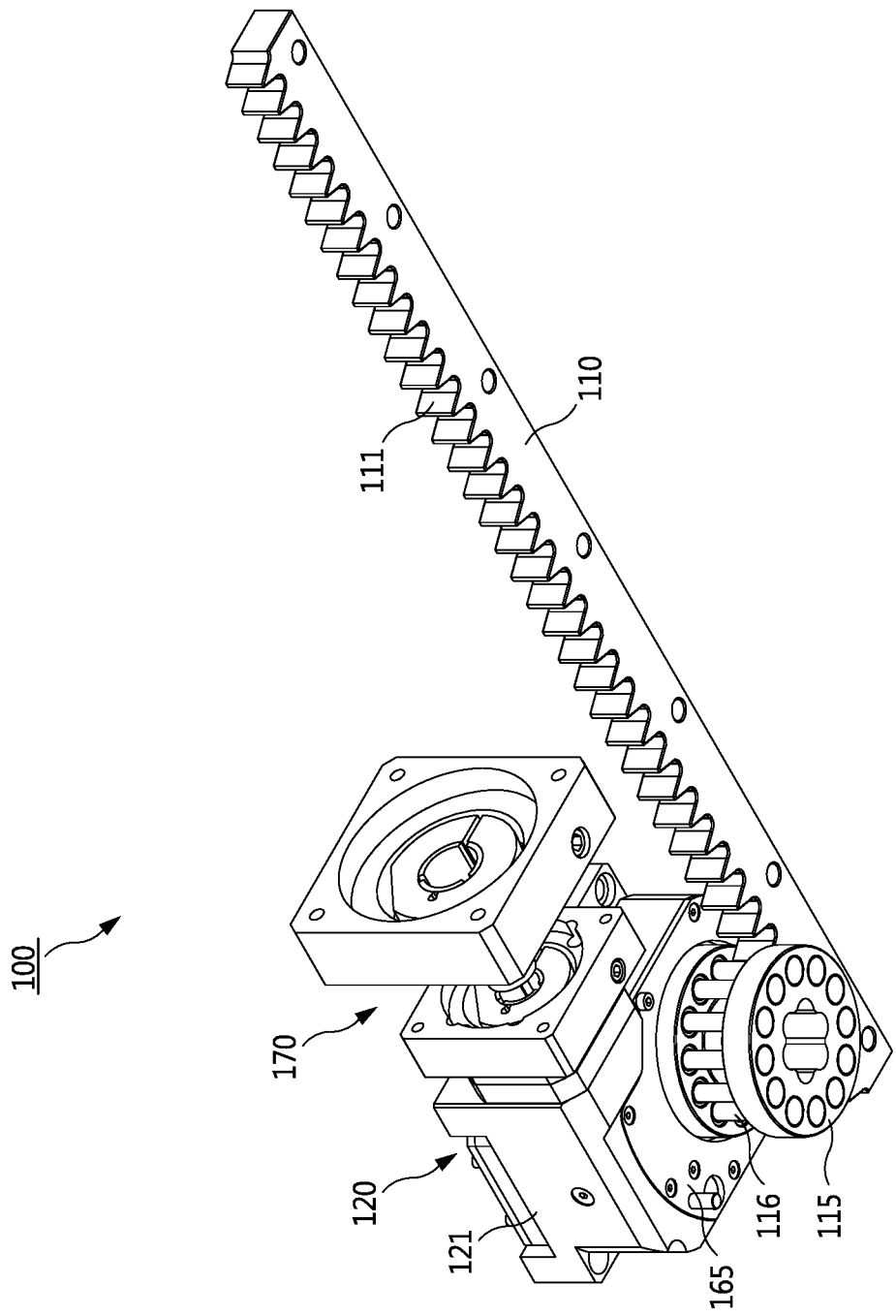
Figure 5:
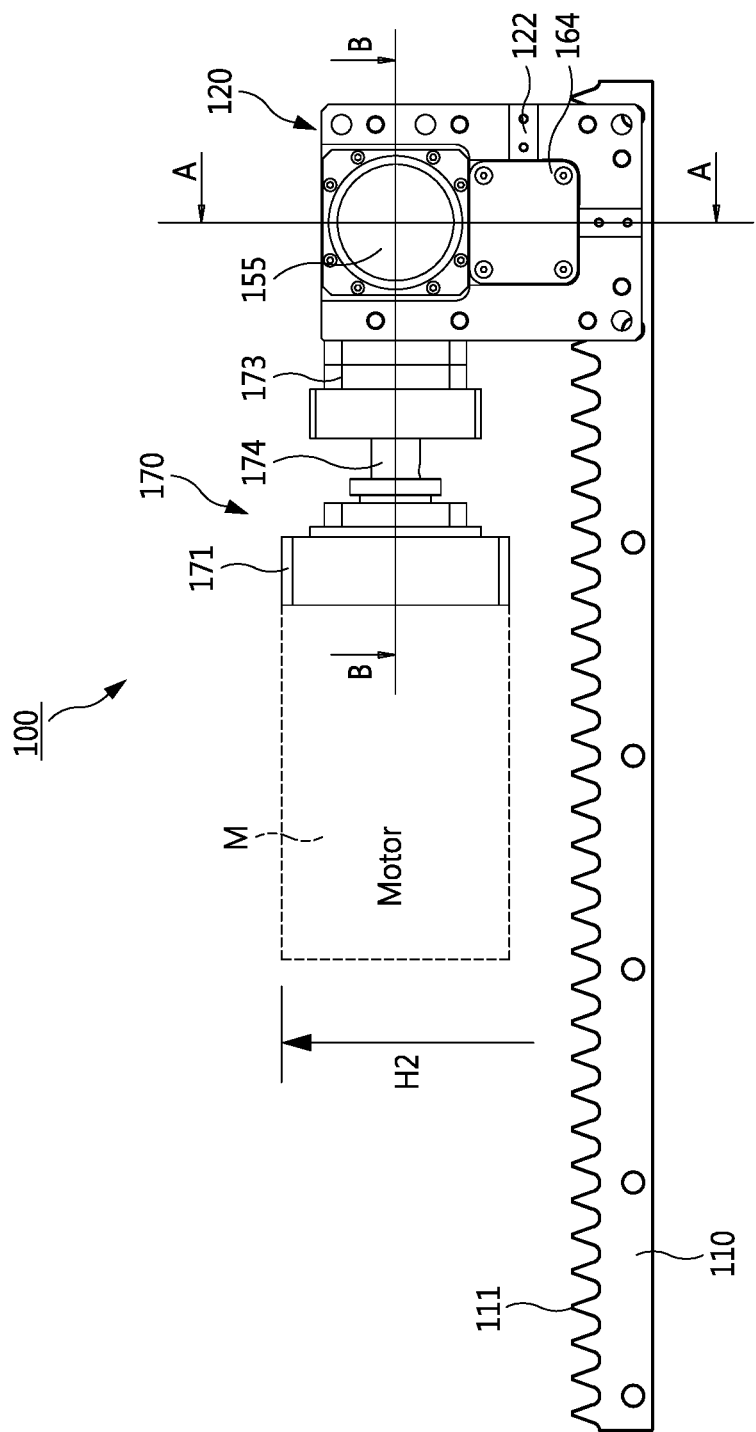
FIG. 5 is a front side view of FIG. 2.
Figure 6:
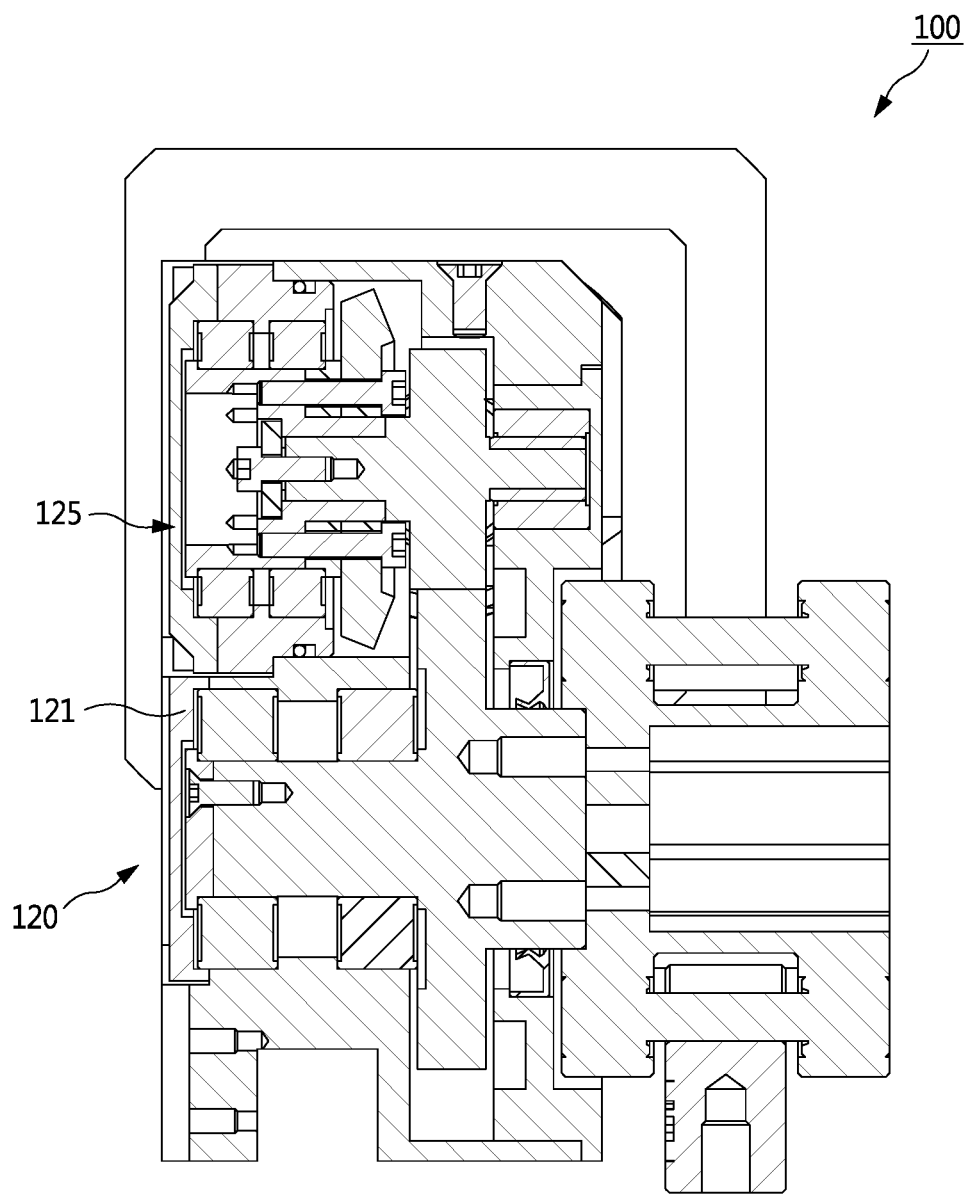
FIG. 6 is a cross-sectional view taken along a line A-A of FIG. 5.
Figure 7:
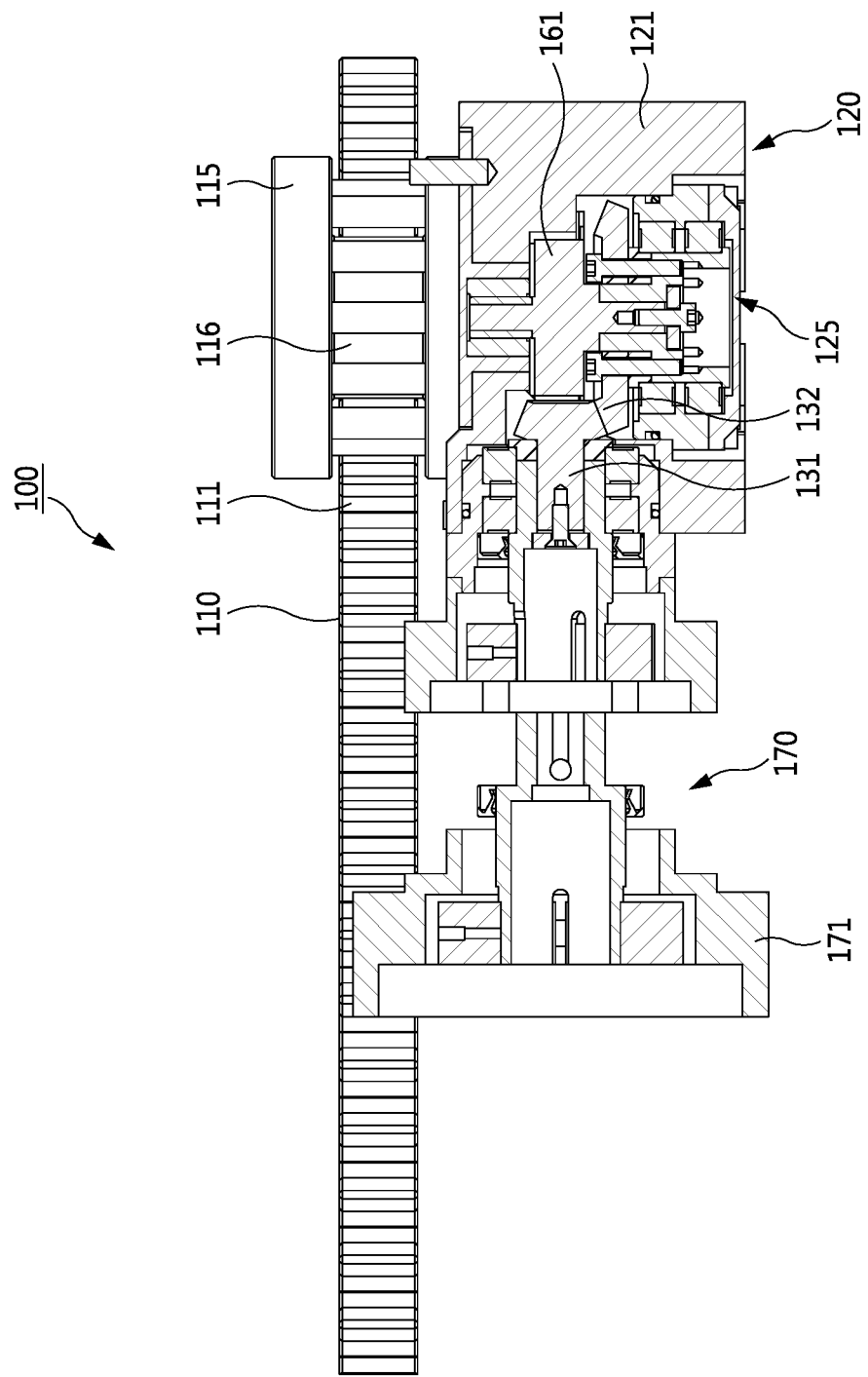
FIG. 7 is a cross-sectional view taken along a line B-B of FIG. 5.
Figure 8:
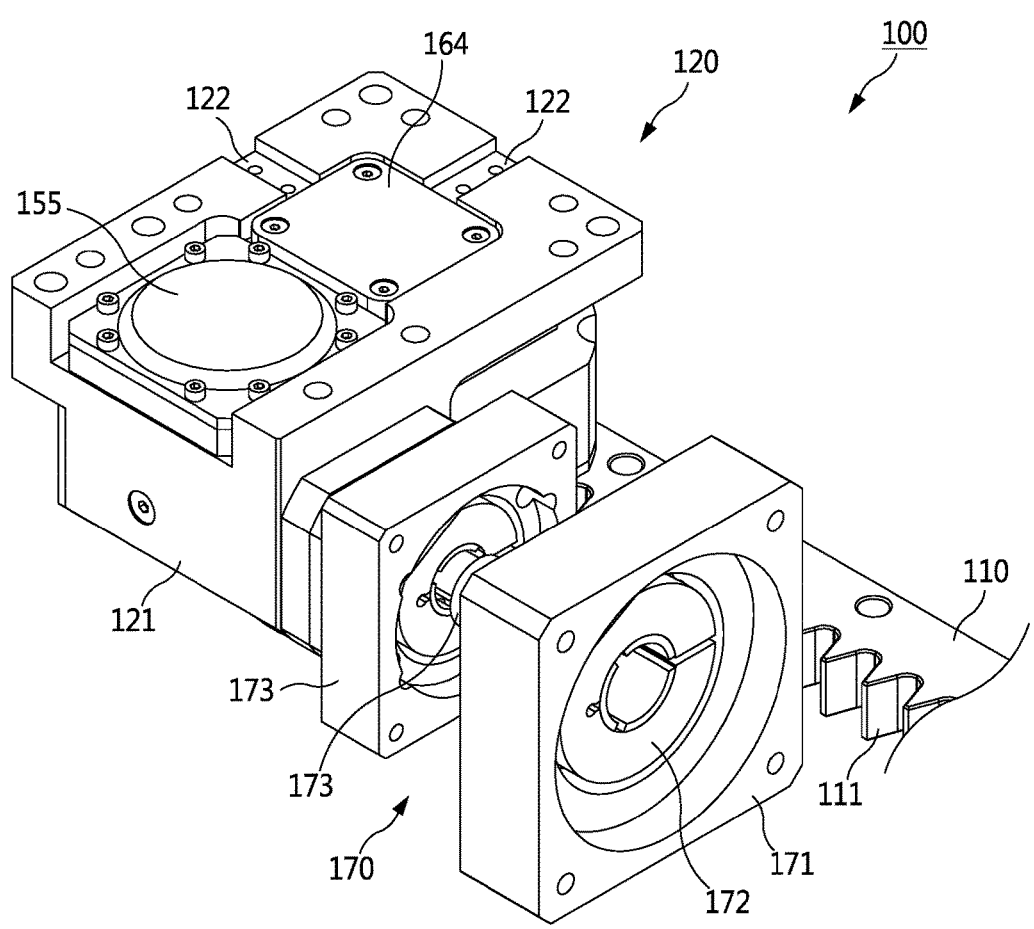
FIGS. 8 and 9 are enlarged views of major parts of FIGS. 3 and 4, respectively.
Figure 9:
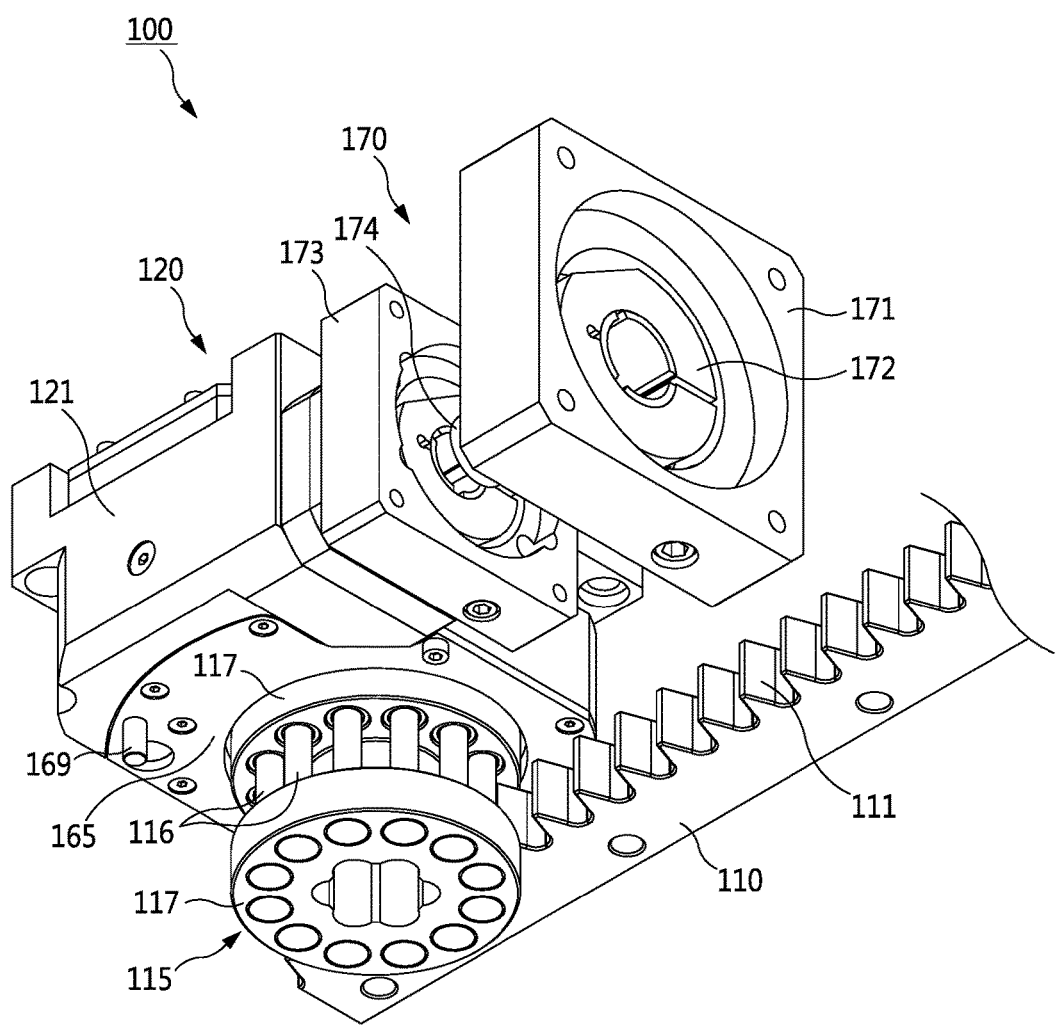
Figure 10:
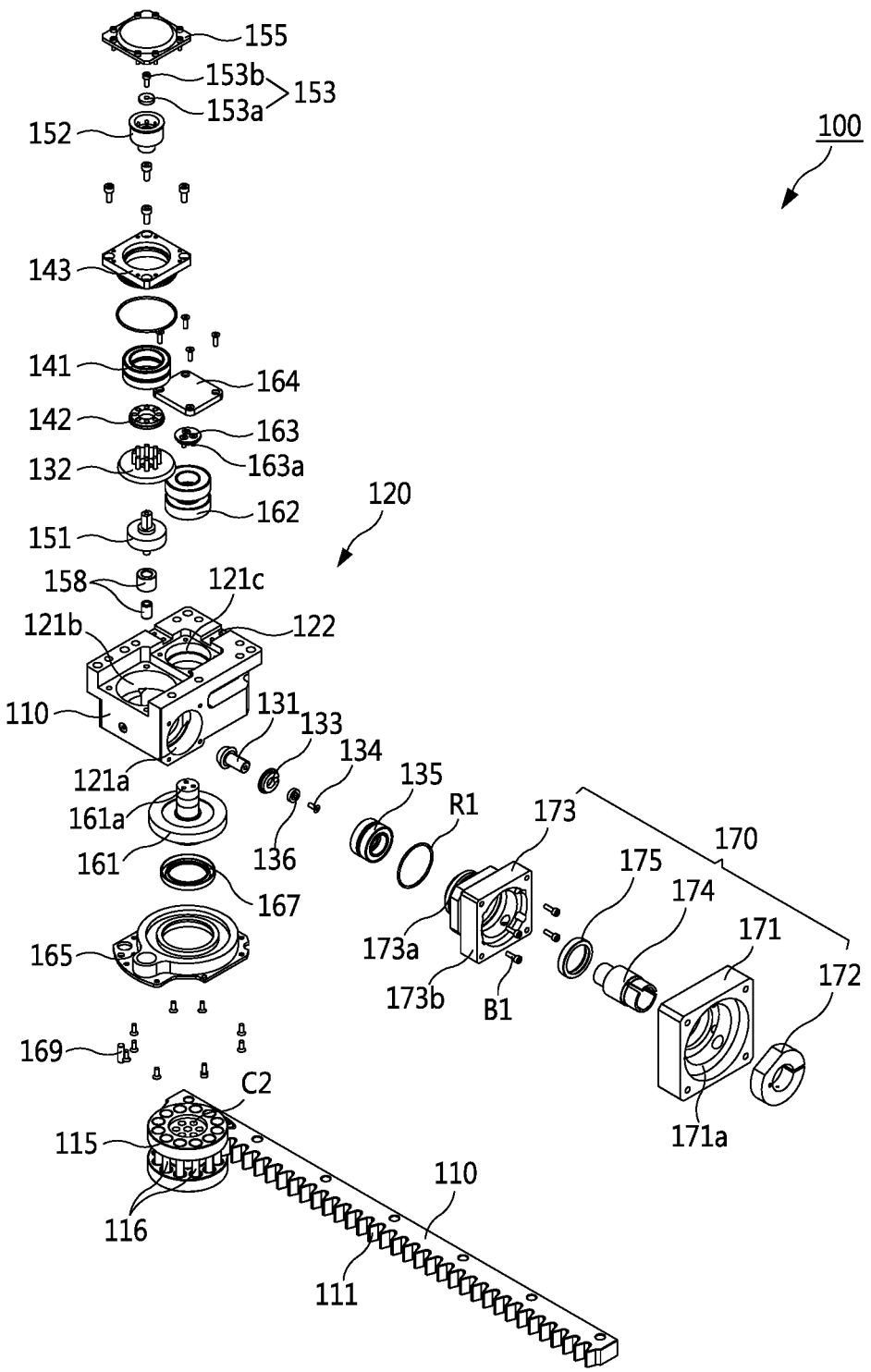
FIGS. 10 and 11 are exploded perspective views of FIGS. 8 and 9.
Figure 11:
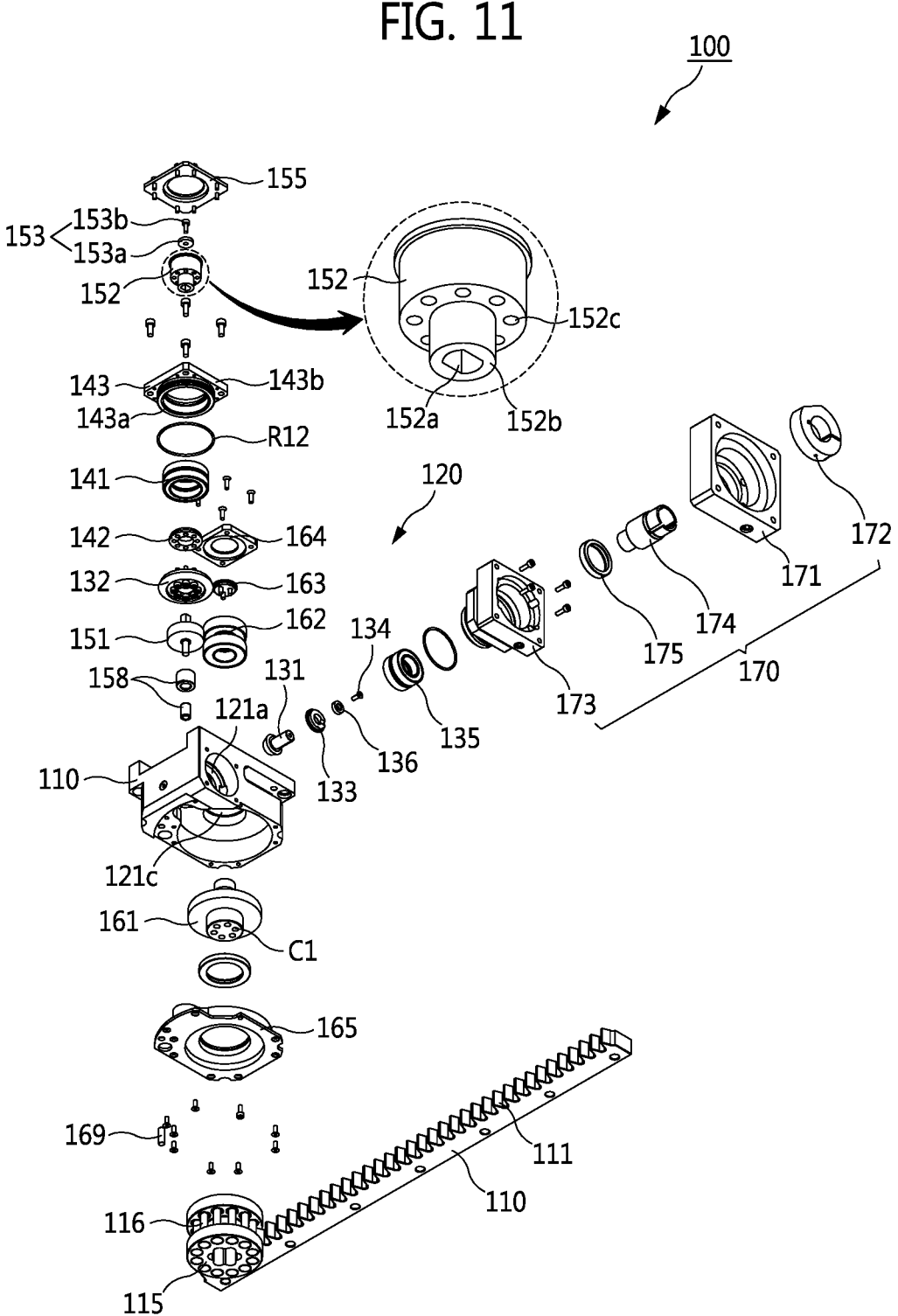
Figure 12:
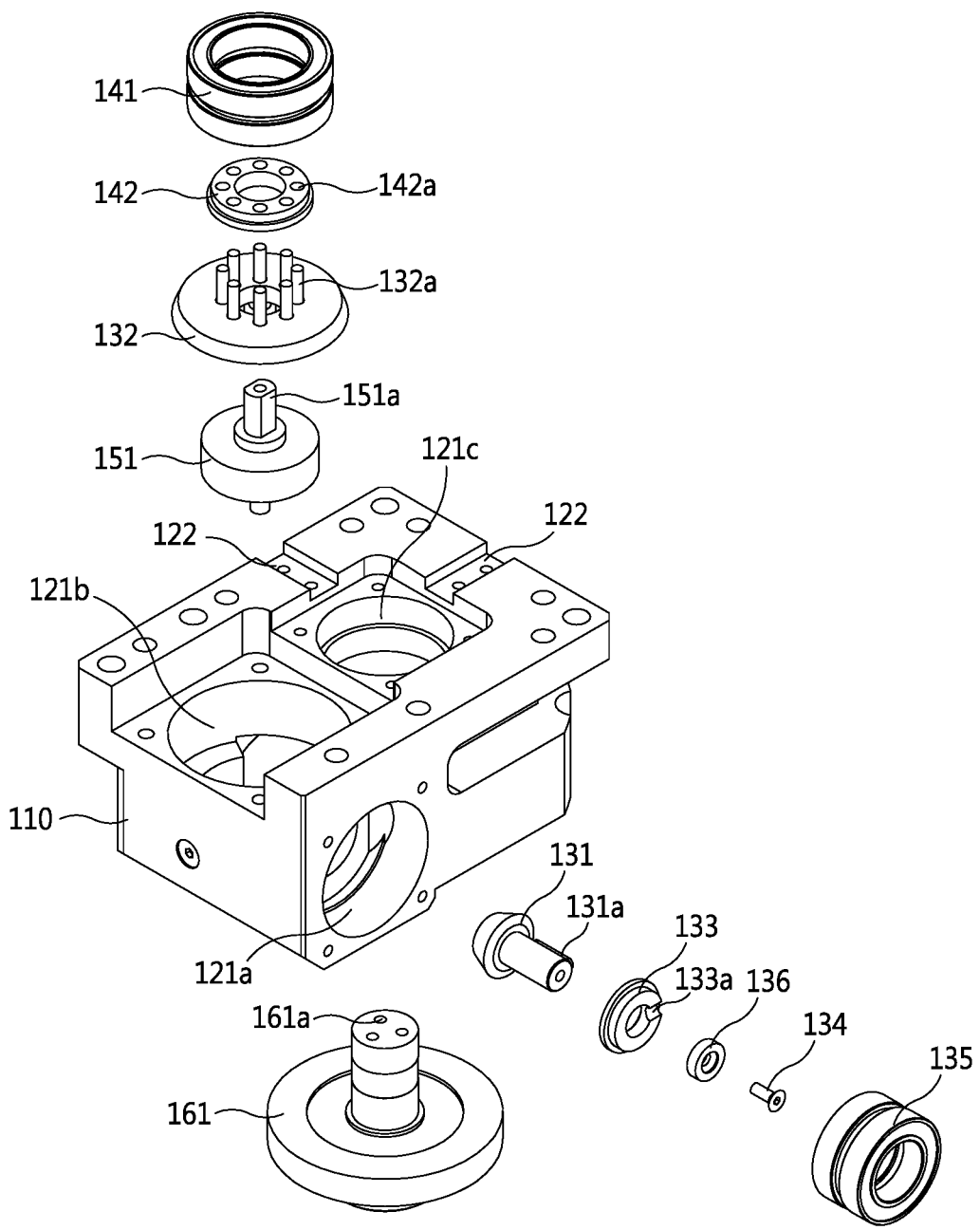
FIGS. 12 and 13 are enlarged views of major parts of FIGS. 10 and 11, respectively.
Figure 13:
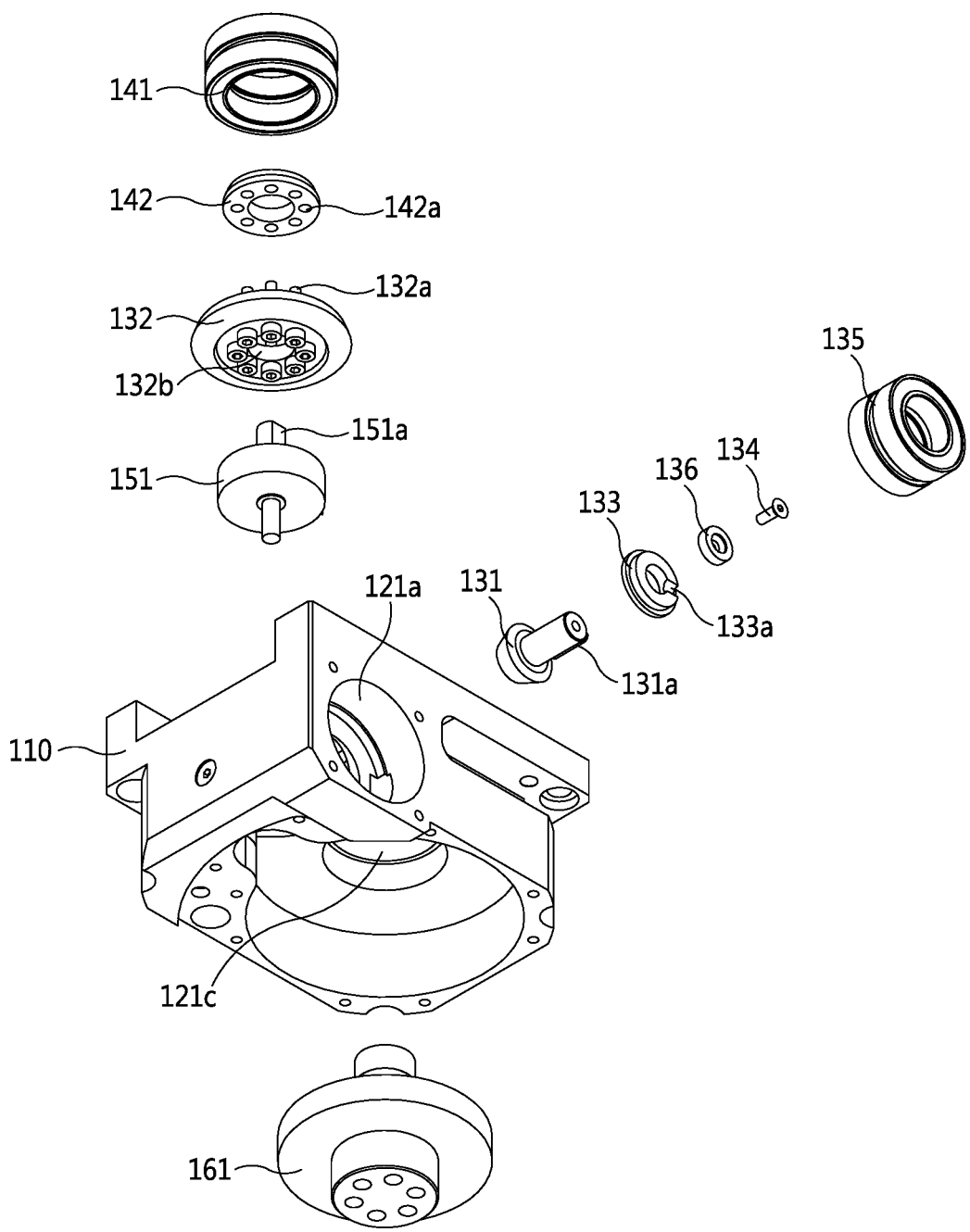
Figure 14:
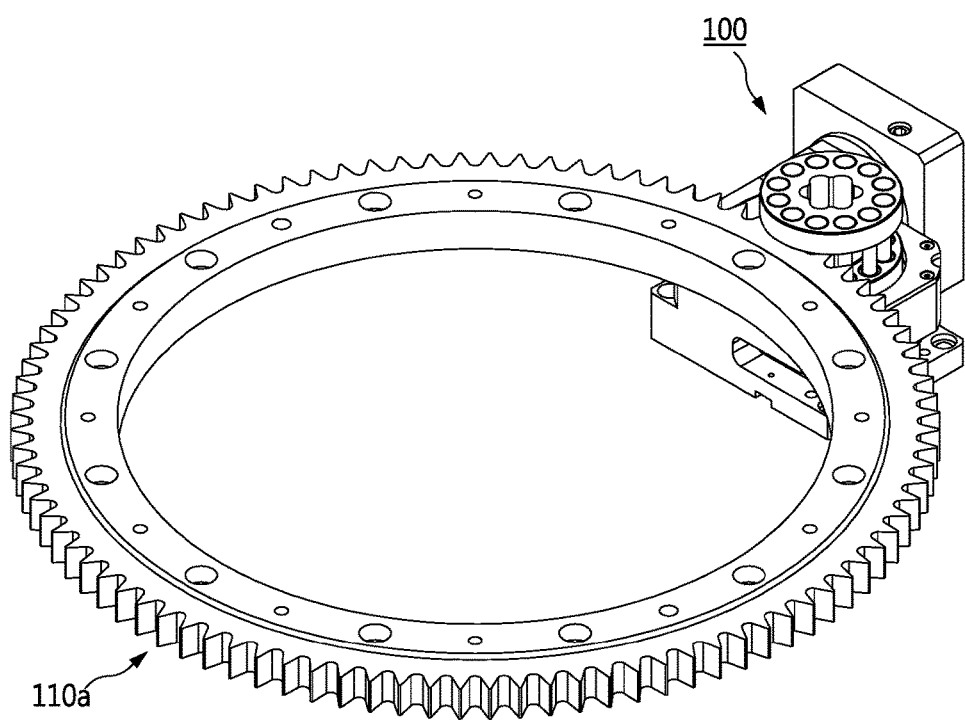
FIG. 14 is a perspective view of a power transmission device according to an embodiment being coupled to an external gear.
Figure 15:
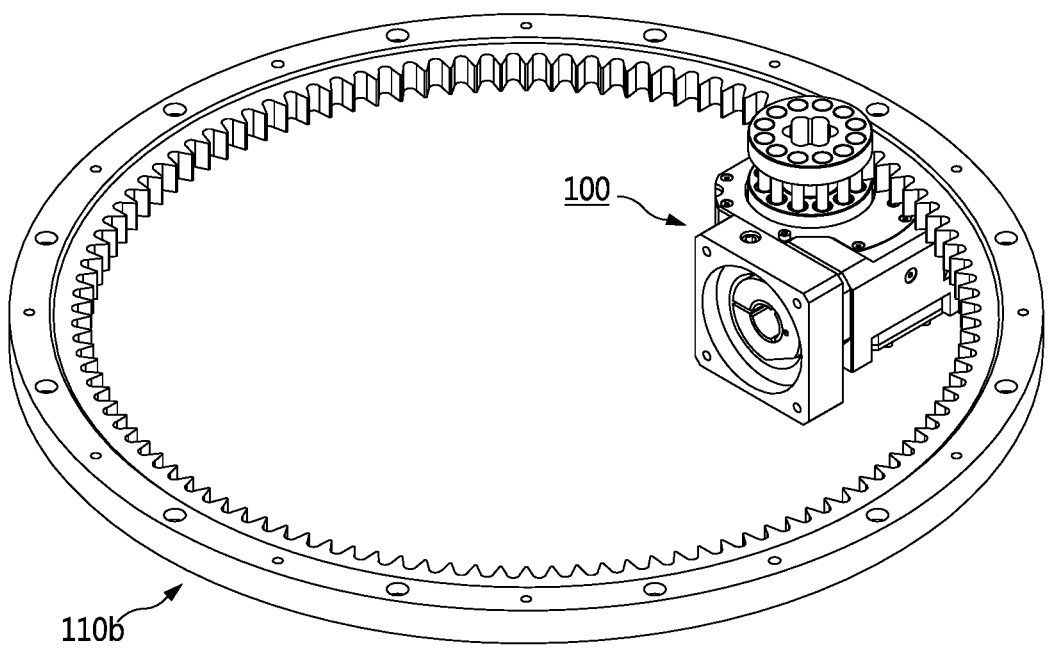
FIG. 15 is a perspective view of a power transmission device according to an embodiment being coupled to an internal gear.

FIG. 2 is a perspective view of a power transmission device according to an embodiment being coupled to a rack. FIGS. 3 and 4 are perspective views of FIG. 2 at different angles. FIG. 5 is a front side view of FIG. 2. FIG. 6 is a cross-sectional view taken along a line A-A of FIG. 5. FIG. 7 is a cross-sectional view taken along a line B-B of FIG. 5. FIGS. 8 and 9 are enlarged views of major parts of FIGS. 3 and 4, respectively. FIGS. 10 and 11 are exploded perspective views of FIGS. 8 and 9. FIGS. 12 and 13 are enlarged views of major parts of FIGS. 10 and 11, respectively. FIG. 14 is a perspective view of a power transmission device according to an embodiment being coupled to an external gear. FIG. 15 is a perspective view of a power transmission device according to an embodiment being coupled to an internal gear.

Referring to FIGS. 2 to 13, a power transmission device 100 according to the present embodiment may perform a stable operation and may also be widely applied to compact apparatus such as an index system because an overall height H2 (see FIG. 5) may be much lower than the height H1 of the power transmission device 1 of FIG. 1. The power transmission device 100 may include a pin gear 115 that interacts with a rack 110 as an outer gear, a motor M that generates power for rotation of the pin gear 115, and a motion transfer unit 120 that transfers a rotational motion of the motor M to a rotational motion of the pin gear 115.

In the present embodiment, the rack 110 as a linear rod-type gear may perform a linear motion due to the interaction with the pin gear 115. For example, when the pin gear 115 rotates in place, the rack 110 may perform a linear motion.

For reference, according to the present embodiment, although the rack 110 is disclosed as an outer gear, the outer gear may be an external gear 110a of FIG. 14 or an internal gear 110b of FIG. 15.

For example, when the outer gear is the rack 110 as illustrated in FIG. 2, the rack 110 may perform a linear motion as the power transmission device 100 according to the present embodiment is driven. When the outer gear is the external gear 110a or the internal gear 110b as illustrated in FIGS. 14 and 15, the external gear 110a or the internal gear 110*b* may perform a rotational motion as the power transmission device 100 according to the present embodiment is driven.

A rack tooth shape 111 is formed at one side of the rack 110. The rack tooth shape 111 is continuously and uniformly formed at one side of the rack 110 along a lengthwise direction of the rack 110. The rack tooth shape 111 formed on the rack 110 may be any one of a trochoid tooth shape, a cycloid tooth shape, and an involute tooth shape.

In order for the rack 110 to perform a linear motion, the pin gear 115 may perform a rotational motion in place by being coupled to the rack 110.

As illustrated in detail in FIG. 9, the pin gear 115 has a structure in which a plurality of power transmission pins 116 are connected in a circumferential direction between pin gear main bodies 117 that are parallelly arranged spaced part from each other.

The interval between the power transmission pins 116 may correspond to the rack tooth shape 111 formed on the rack 110. Regarding a detailed structure of the pin gear 115, a plurality of documents filed by and registered to the present applicant are referred to.

As illustrated in FIG. 5, the motor M applied to the power transmission device 100 according to the present embodiment, unlike the power transmission device 1 of FIG. 1, is arranged in a direction crossing a rotation axis of the pin gear 115 and generates power for rotation of the pin gear 115 at the position.

In other words, according to the present embodiment, unlike the existing motor that is directly connected to the rotation axis of the pin gear, the motor M is coupled hanging sideways and crossing the rotation axis of the pin gear 115. In other words, the motor M is connected parallel to the lengthwise direction of the rack 110. Accordingly, since the overall height H2 the power transmission device 100 may be much lower than the height H1 of the power transmission device 1 of FIG. 1, the power transmission device 100 according to the present embodiment may be widely applied to compact apparatuses such as an index system.

The motion transfer unit 120 is connected to the pin gear 115 and the motor M between the pin gear 115 and the motor M, and transfers the rotational motion of the motor M to the rotational motion of the pin gear 115.

In the present embodiment, the motion transfer unit 120 may include a unit housing 121, and a built-in deceleration module 125 provided in the unit housing 121 and decelerates a rotation force of the motor M and transfers a decelerated rotation force to the pin gear 115.

The unit housing 121 is an exterior structure of the motion transfer unit 120. Since the built-in deceleration module 125 having a plurality of part combinations in the unit housing 121 that are arranged and connected with an organic mechanism, the unit housing 121 may be manufactured of a hollow metal structure.

As illustrated in FIGS. 12 and 13, first to third openings 121*a* to 121*c* are formed in side surfaces of the unit housing 121. The first to third openings 121*a* to 121*c* may communicate with one another in the unit housing 121.

The built-in deceleration module 125 is coupled to be compact in the unit housing 121 through the first to third openings 121*a* to 121*c*.

As such, as the built-in deceleration module 125 is provided in an optimal state in the unit housing 121, the motor M may be mounted sideways and also the overall height H2 of the power transmission device 100 may be reduced, and thus the power transmission device 100 according to the present embodiment may be widely applied to compact apparatuses such as an index system.

For reference, as illustrated in FIGS. 6 and 7, among a plurality of parts provided in the unit housing 121 and connected to one another, except cover structures such as a drive gear cover 155, a driven gear cover 164, and an output end fixed plate 165, the other parts correspond to the built-in deceleration module 125, and thus the built-in deceleration module 125 is not separately distinguished in the following description.

Prior to the description of the built-in deceleration module 125, typical parts mounted on the first to third openings 121*a* to 121*c* of the unit housing 121 are briefly described below.

A drive gear 131 that is driven by receiving the rotational power from the motor M coupled to the outside of the unit housing 121, and parts attached to the drive gear 131, are coupled in order in a first opening 121*a*.

A driven gear 132 engaged with the drive gear 131 to decelerate the rotation force of the motor M, a drive gear 151 connected to the driven gear 132, and parts attached to the driven gear 132 and the drive gear 151, are coupled in a second opening 121*b* arranged crossing the first opening 121*a*.

A driven gear 161 rotatably engaged with the drive gear 151 and parts attached to the driven gear 161 are coupled to one another in a third opening 121*c*. As the driven gear 161 is finally connected to the pin gear 115, the pin gear 115 is rotated.

As a result, the rotation force from the motor M is transferred to the drive gear 131, the driven gear 132, the drive gear 151, the driven gear 161, and the pin gear 115, thereby rotating the pin gear 115.

As described above, the unit housing 121 forms an exterior structure of the motion transfer unit 120.

An assembly reference alignment portion 122 is formed at one side surface of the unit housing 121. A separate device (not shown) for forming an assembly reference may be provided on the assembly reference alignment portion 122. An assembly reference for assembling the power transmission device 100 by using parts may be formed through the device. In other words, when the power transmission device 100 according to the present embodiment is assembled by using parts, a reference for aligning an assembly distance from the rack 110, a relative position, or an assembly axis line of the motor M may be formed through the device provided on the assembly reference alignment portion 122.

In the present embodiment, the assembly reference alignment portion 122 may be plurally provided to cross one another, and may have a shape of a groove. However, the assembly reference alignment portion 122 may have a shape of a protrusion.

A motor connection portion 170 is provided at one side of the unit housing 121. The motor connection portion 170 connects the motor M (see FIG. 6) arranged along the lengthwise direction of the rack 110 to the drive gear 131 connected to the first opening 121*a*.

The motor connection portion 170 may include a motor mount block 171 on which the motor M is mounted, a motor clamp 172 coupled to the motor mount block 171 to clamp the motor M, an input axis structure 173 coupled to the first opening 121*a* of the unit housing 121, and an input axis fixing adaptor 174 connecting the input axis structure 173 and the motor mount block 171.

Since most motors have a rectangular sectional shape, in the present embodiment, the motor mount block 171 may also have a rectangular block structure corresponding to the shape of the motor M. However, the present disclosure is not limited thereto. In other words, the motor mount block 171 does not necessarily have a rectangular block structure, and may have a circular shape or other polygonal block structures.

The motor clamp 172 is inserted in a clamp accommodation portion 171*a* in the motor mount block 171 and firmly clamps the motor M.

The input axis structure 173 is a structure coupled to an entrance of the first opening 121*a* of the unit housing 121. The input axis structure 173 may be coupled to the entrance of the first opening 121*a* of the unit housing 121 by using a plurality of bolts B1. In this state, a bearing support device 173*a* of the input axis structure 173 is inserted in the first opening 121*a*, and a remaining body 173*b* may protrude out of the unit housing 121. An O-ring R1 may be provided inside the bearing support device 173*a* for sealing.

The input axis fixing adaptor 174 is a structure connected to the input axis structure 173 and the motor mount block 171, and substantially transfers the rotation force of the motor M to the drive gear 131. Accordingly, the input axis fixing adaptor 174 may be connected to a drive side bearing 135.

When the input axis fixing adaptor 174 and the drive side bearing 135 are connected, to prevent leakage of oil therebetween, an input side oil seal 175 is provided in front of the input axis fixing adaptor 174 toward the unit housing 121.

The power transmission device 100 according to the present embodiment may include, as a part of the built-in deceleration module 125, the drive gear 131 and the driven gear 132 engaged with the drive gear 131 and decelerating a rotation force of the drive gear 131.

As described above, the drive gear 131 is a part rotated by the motor M and arranged in the first opening 121*a* of the unit housing 121, and the driven gear 132 is arranged in the second opening 121*b* of the unit housing 121 and engaged with the drive gear 131.

Although a worm and a worm wheel may be used as the drive gear 131 and the driven gear 132, a bevel gear is used in the present embodiment.

For convenience of explanation, the drive gear 131 and the driven gear 132 are described to be a drive bevel gear 131 and a driven bevel gear 132, respectively. To avoid any possible confusion, the drive gear 131 and the drive bevel gear 131, and the driven gear 132 and the driven bevel gear 132, have the same reference numerals.

As illustrated in detail in FIGS. 12 and 13, the sizes of the drive bevel gear 131 and the driven bevel gear 132 are different from each other. In other words, the size, that is, the number of teeth of the drive bevel gear 131 is quite less than that of the driven bevel gear 132. Thus, even when the drive bevel gear 131 rotates once, the driven bevel gear 132 connected to the drive gear 151 does not rotate once, thereby enabling a deceleration ratio.

A drive bevel gear fixing member 133 and a first coupling portion 134 are provided such that the drive bevel gear 131 is coupled to the driven bevel gear 132 in the first opening 121*a* of the unit housing 121.

The drive bevel gear fixing member 133 fixes the drive bevel gear 131 to prevent the drive bevel gear 131 from idling. To this end, a key block 131*a* is formed on the drive bevel gear 131, and a key hole 133*a* into which the key block 131*a* is inserted is formed in the drive bevel gear fixing member 133.

The first coupling portion 134 couples the drive bevel gear fixing member 133 to the drive bevel gear 131. The first coupling portion 134 may be a flat head cap bolt having a head that does not protrude outside.

The drive side bearing 135 is plurally provided as a device for guiding a smooth rotational motion of the drive bevel gear 131 along the axial direction of the drive bevel gear 131. The drive side bearing 135 may be an insulating angular ball bearing.

When the drive bevel gear 131 is assembled including the drive side bearing 135, the drive bevel gear 131 is pushed in the axial direction and thus an allowance of the drive side bearing 135 increases. Accordingly, a drive bevel gear allowance adjustment member 136 is provided to remove the allowance.

In other words, the allowance adjustment member 136 is coupled to the drive bevel gear 131 by the first coupling portion 134 by contacting the drive bevel gear fixing member 133, and adjusts allowance in the axial direction of the drive bevel gear 131.

The allowance adjustment member 136 may be provided as a ring type structure and may have an appropriate thickness according to a degree of the allowance.

In order for the above-described drive bevel gear 131 to interact with the driven bevel gear 132 in the unit housing 121, the driven bevel gear 132 is inserted into the second opening 121*b* to be engaged with the drive bevel gear 131.

A plurality of driven side bearings 141 that are connected to the driven bevel gear 132 to guide rotation of the driven bevel gear 132 are provided around the driven bevel gear 132. The driven side bearings 141 may be insulating deep groove ball bearings, unlike the above-described drive side bearing 135.

A driven bevel gear fixing adaptor 143 for fixing the driven bevel gear 132 to the unit housing 121 is provided in the unit housing 121.

The driven bevel gear fixing adaptor 143 may include a bearing support device 143*a* for supporting the driven side bearings 141, and an adaptor block 143*b* connected to the bearing support device 143*a*. An O-ring R12 may be provided inside the bearing support device 143*a*.

When the driven bevel gear 132 including the driven side bearings 141 is inserted into the second opening 121*b* of the unit housing 121 and assembled with the drive bevel gear 131, an allowance may be generated at an assembly position due to a tolerance of a part or an assembly tolerance. Accordingly, a driven bevel gear allowance adjustment member 142 is provided to remove the allowance. In other words, the driven bevel gear allowance adjustment member 142 is connected to the driven bevel gear 132, and adjusts assembly position allowance of the driven bevel gear 132.

A plurality of connection pins 132*a* are provided to connect the driven bevel gear allowance adjustment member 142 to the driven bevel gear 132 are provided on the driven bevel gear 132. A plurality of first pin insertion holes 142*a* in which the connection pins 132*a* are inserted are formed in the driven bevel gear allowance adjustment member 142.

The drive gear 151 and the driven gear 161 are provided as parts of the built-in deceleration module 125, and are coupled to neighboring parts in the unit housing 121 to be compact.

As described above, the drive gear 151 is connected to the driven bevel gear 132. The driven gear 161 connects the drive gear 151 and the pin gear 115.

To describe the drive gear 151 first, the drive gear 151, like the driven bevel gear 132, is connected to the driven bevel gear 132 in an area of the second opening 121*b* of the unit housing 121.

A drive gear support portion 158 that is coupled to the unit housing 121 and supports the drive gear 151 is provided at one side of the drive gear 151.

Since the drive gear 151 is connected to the driven bevel gear 132, the drive gear 151 may be rotated together with the driven bevel gear 132.

In this state, the drive gear 151 and the driven bevel gear 132 are not directly connected to each other, but are connected to each other via a drive gear pressing and insertion structure 152.

The drive gear pressing and insertion structure 152, as illustrated in FIG. 11 by being enlarged, may include a shaft pressing and insertion portion 152b having a shaft pressing and insertion hole 152a in which a non-circular shaft 151a (see FIG. 12) formed at one side end of the drive gear 151 is pressed and inserted, and a plurality of second pin insertion holes 152c in which the connection pins 132a formed on the driven bevel gear 132 are inserted.

The non-circular shaft 151a of the drive gear 151 may be pressed and inserted into the shaft pressing and insertion hole 152a of the shaft pressing and insertion portion 152b of the drive gear pressing and insertion structure 152 arranged thereabove, by passing through an inner center hole 132b (see FIG. 13) of the driven bevel gear 132. In this state, since the non-circular shaft 151a may be disassembled from the shaft pressing and insertion hole 152a with the pressing and insertion only, a drive gear coupling portion 153 may be provided to couple the drive gear 151 and the drive gear pressing and insertion structure 152. The drive gear coupling portion 153 may include a washer 153a, and a bolt as a second coupling portion 153b coupled to the drive gear 151 through the washer 152a.

When the drive gear 151 and the drive gear pressing and insertion structure 152 are coupled to each other, the connection pins 132a formed on the driven bevel gear 132 may be inserted into the second pin insertion holes 152c of the drive gear pressing and insertion structure 152 by passing through the first pin insertion holes 142a formed in the driven bevel gear allowance adjustment member 142.

The drive gear cover 155 for protecting the drive gear 151 is coupled to the unit housing 121 in an area of the second opening 121b. The drive gear cover 155 may be detachably coupled to the unit housing 121 by using bolts for interior maintenance and repair.

Next, the driven gear 161 is coupled to the third opening 121c of the unit housing 121 to neighbor the drive gear 151.

The driven gear 161 transfers the rotation force received from the motor M via the drive bevel gear 131, the driven bevel gear 132, and the drive gear 151 to the pin gear 115. Accordingly, the driven gear 161 is engaged with the drive gear 151 in the unit housing 121.

To connect the driven gear 161 to the pin gear 115, connection holes C1 and C2 (see FIGS. 10 and 11) for mutual connection are formed in the driven gear 161 and the pin gear 115, respectively. A pin (not shown) is coupled to each of the connection holes C1 and C2 to connect the driven gear 161 and the pin gear 115 with each other.

A plurality of output side bearings 162 for guiding the rotation of the driven gear 161 are provided around the driven gear 161. The output side bearings 162 may be insulating angular ball bearings.

As a device to apply a preliminary pressure to the driven gear 161 when the driven gear 161 is rotated, a driven gear preliminary pressure member 163 is connected to the driven gear 161. A plurality of preliminary pressure holes 161a are formed at a end portion of the driven gear 161 to connect the driven gear preliminary pressure member 163 to the driven gear 161. A plurality of preliminary pressure protrusions 163a coupled to the preliminary pressure holes 161a are provided on the driven gear preliminary pressure member 163. An output side oil seal 167 is coupled to a lower portion of the driven gear 161.

The driven gear cover 164 for protecting the driven gear 161 is coupled to the unit housing 121 in an area of the third opening 121c to which the drive gear 161 is coupled.

The output end fixed plate 165 is coupled to the unit housing 121 at the opposite side of the driven gear cover 164 and prevents the driven gear 161 from escaping.

For the interior maintenance and repair, the driven gear cover 164 and the output end fixed plate 165 may be detachably coupled to each other by using bolts.

According to the above structure, when the motor M is operated, the rotation force from the motor M may be transferred to the drive gear 131, the driven gear 132, the drive gear 151, the driven gear 161, and the pin gear 115, thereby rotating the pin gear 115. Accordingly, the rack 110 may move according to the interaction with the pin gear 115.

According to the power transmission device 100 of the present embodiment having the above structure and operation, a stable operation may be possible and, in particular, the overall height H2 may be reduced and thus the power transmission device may be widely applied to compact apparatuses such as an index system.

While this inventive concept has been particularly shown and described with reference to preferred embodiments thereof, it will be understood by those of ordinary skill in the art that various changes in form and details may be made therein without departing from the spirit and scope of the inventive concept as defined by the appended claims. Therefore, the scope of the inventive concept is defined not by the detailed description of the inventive concept but by the appended claims, and all differences within the scope will be construed as being included in the present inventive concept.

INDUSTRIAL APPLICABILITY

The power transmission device according to the present inventive concept may be used for various machine tools requiring a rotational motion or a linear motion, industrial machinery, semiconductor or flat display manufacturing facilities, and various kinds of logistics transfer facilities.

The invention claimed is:
1. A power transmission device comprising:
a pin gear having a plurality of power transmission pins that are rotationally moved by a corresponding tooth shape formed on an outer gear;
a motor arranged in a direction substantially perpendicular to a rotation axis of the pin gear, and generating power to rotate the pin gear; and
a motion transfer unit connected to the pin gear and the motor between the pin gear and the motor, and transferring a rotational motion of the motor to a rotational motion of the pin gear;
wherein the motion transfer unit comprises:
a unit housing; and
a built-in deceleration module provided in the unit housing, and decelerating a rotation force of the motor and transferring a decelerated rotational force to the pin gear, wherein the built-in deceleration module comprises:
a first drive gear inserted in a first opening formed in the unit housing in a direction substantially perpendicular to the rotation axis of the pin gear, and rotated by the motor; and a first driven gear inserted in a second opening communicating with the first opening and formed in a direction crossing the first opening, and decelerating a rotation force of the first drive gear by being engaged with the first drive gear,
wherein the first drive gear is a drive bevel gear and the first driven gear is a driven bevel gear,
wherein the built-in deceleration module further comprises a second drive gear that is connected to the driven bevel gear in an area of the second opening
wherein the built-in deceleration module further comprises:
  a drive gear pressing and insertion structure connected to the second drive gear forming one body, and comprising a shaft pressing and insertion portion having a shaft pressing and insertion hole in which a non-circular shaft formed at one end portion of the second drive gear is pressed and inserted, and a plurality of pin insertion holes in which a plurality of connection pins formed on the driven bevel gear are inserted; and
  a drive gear coupling portion coupling the second drive gear and the drive gear pressing and insertion structure.

2. The power transmission device of claim 1, wherein at least one assembly reference alignment portion is further formed in the unit housing.

3. The power transmission device of claim 1, wherein the outer gear is one of a rack, an external gear, and an internal gear.

4. The power transmission device of claim 1, wherein the built-in deceleration module further comprises:
  a drive bevel gear fixing member coupled to the drive bevel gear and fixing the drive bevel gear; and
  a first coupling portion coupling the drive bevel gear fixing member to the drive bevel gear.

5. The power transmission device of claim 4, wherein the built-in deceleration module further comprises a plurality of drive side bearings that are arranged spaced apart from the drive bevel gear fixing member and guiding rotation of the drive bevel gear.

6. The power transmission device of claim 4, wherein the built-in deceleration module further comprises a drive bevel gear allowance adjustment member that is coupled to the drive bevel gear by the first coupling portion by contacting the drive bevel gear fixing member and adjusts allowance in an axial direction of the drive bevel gear.

7. The power transmission device of claim 1, wherein the built-in deceleration module further comprises a plurality of driven side bearings that are connected to the driven bevel gear at the second opening and guide rotation of the driven bevel gear.

8. The power transmission device of claim 7, wherein the built-in deceleration module further comprises a driven bevel gear allowance adjustment member that is connected to the driven bevel gear and adjusts assembly position allowance of the driven bevel gear.

9. The power transmission device of claim 8, wherein the built-in deceleration module further comprises a driven bevel gear fixing adaptor that fixes the driven bevel gear to the unit housing.

10. The power transmission device of claim 1, wherein the built-in deceleration module further comprises a second driven gear coupled to a third opening formed in the unit housing in a direction parallel to the second opening neighboring the second drive gear, and transferring the rotation force from the second drive gear to the pin gear.

11. The power transmission device of claim 10, wherein the built-in deceleration module further comprises:
  a plurality of output side bearings coupled to the second driven gear and guiding rotation of the second driven gear; and
  a driven gear preliminary pressure member coupled to the second driven gear and preliminarily pressing the second driven gear.

12. The power transmission device of claim 10, wherein the motion transfer unit further comprises:
  a driven gear cover coupled to the unit housing and protecting the second driven gear;
  an output end fixed plate coupled to the unit housing at an opposite side of the driven gear cover and preventing escape of the second driven gear; and
  a drive gear cover coupled to the unit housing and protecting the second drive gear.

13. The power transmission device of claim 1, further comprising a motor connection portion coupled to the first opening and connecting the motor and the first drive gear.

14. The power transmission device of claim 13, wherein the motor connection portion comprises:
  a motor mount block on which the motor is mounted;
  a motor clamp coupled to the motor mount block and clamping the motor;
  an input axis structure coupled to the first opening of the unit housing;
  an input axis fixing adaptor connected to the input axis structure and the motor mount block and transferring a rotation force of the motor to the first drive gear; and
  an input side oil seal arranged in front of the input axis fixing adaptor toward the unit housing.

* * * * *